(12) United States Patent
Iglesias Alvaro-Gracia

(10) Patent No.: US 8,319,085 B2
(45) Date of Patent: Nov. 27, 2012

(54) MUSICAL CONTROLLER

(76) Inventor: Jaime Iglesias Alvaro-Gracia, Madrid (ES)

( * ) Notice: Subject to any disclaimer, the term of this patent is extended or adjusted under 35 U.S.C. 154(b) by 43 days.

(21) Appl. No.: 12/864,116

(22) PCT Filed: Jan. 23, 2009

(86) PCT No.: PCT/ES2009/000033
§ 371 (c)(1),
(2), (4) Date: Jul. 22, 2010

(87) PCT Pub. No.: WO2009/092839
PCT Pub. Date: Jul. 30, 2009

(65) Prior Publication Data
US 2010/0288104 A1    Nov. 18, 2010

(30) Foreign Application Priority Data
Jan. 24, 2008  (ES) .................. 200800181

(51) Int. Cl.
*G09B 15/00* (2006.01)
*G09B 15/02* (2006.01)
*G10H 1/00* (2006.01)

(52) U.S. Cl. ............ 84/477 R; 84/600; 84/615; 84/618; 84/645; 84/653; 84/483.2

(58) Field of Classification Search .................. None
See application file for complete search history.

(56) References Cited

U.S. PATENT DOCUMENTS

| | | | |
|---|---|---|---|
| 1,821,311 A | | 9/1931 | Lamp |
| 3,180,201 A | * | 4/1965 | Low, Jr. et al. ............... 84/477 R |
| 3,429,216 A | * | 2/1969 | Lawrence .................... 84/471 R |
| 3,429,217 A | | 2/1969 | Lawrence |
| 3,468,209 A | * | 9/1969 | Barreto ........................ 84/423 R |
| 4,031,800 A | * | 6/1977 | Thompson ................... 84/423 R |
| 4,203,345 A | * | 5/1980 | Collin et al. ..................... 84/478 |
| 4,273,023 A | | 6/1981 | Mercer ............................. 84/454 |
| 4,819,539 A | * | 4/1989 | Searing ............................ 84/476 |

(Continued)

FOREIGN PATENT DOCUMENTS

DE    28 47 159    8/1979

(Continued)

OTHER PUBLICATIONS

International Search Report dated May 4, 2009, issued in corresponding international application No. PCT/ES2009/000033.

(Continued)

*Primary Examiner* — Marlon Fletcher
(74) *Attorney, Agent, or Firm* — Ostrolenk Faber LLP

(57) ABSTRACT

Specially designed for relating musical sounds to the conventional way of writing on a staff and vice versa, the controller is formed by a casing which is flat, cylindrical or some other shape, on which a staff is depicted, with, in the areas of the staff corresponding to each of the musical notes, sensors/push-buttons corresponding to natural, flat and sharp notes (or double sharp or double flat or natural sign, if present on the frame), as well as light indicators. The notes can thus be identified aurally when working on the device as if the music was written on a staff, while if a MIDI signal is connected to the control circuit it is possible to display, in real time, on said staff and via the light indicators, each of the notes of said melody, enabling quick and easy identification of said notes.

10 Claims, 5 Drawing Sheets

U.S. PATENT DOCUMENTS

| | | | |
|---|---|---|---|
| 6,121,529 A * | 9/2000 | Nakata et al. | 84/477 R |
| 6,175,069 B1 * | 1/2001 | Longacre | 84/476 |
| 6,605,767 B2 * | 8/2003 | Fiks et al. | 84/423 R |
| 7,174,510 B2 * | 2/2007 | Salter | 715/709 |
| 7,739,595 B2 * | 6/2010 | Salter | 715/709 |
| 8,039,721 B2 * | 10/2011 | Wold | 84/470 R |
| 2002/0117043 A1 * | 8/2002 | Powley | 84/483.2 |
| 2002/0189425 A1 * | 12/2002 | Hiratsuka et al. | 84/477 R |
| 2004/0069115 A1 * | 4/2004 | Hiratsuka et al. | 84/483.1 |
| 2004/0074376 A1 * | 4/2004 | Varme | 84/483.2 |
| 2004/0137984 A1 * | 7/2004 | Salter | 463/35 |
| 2006/0288842 A1 | 12/2006 | Sitrick et al. | 84/477 R |
| 2007/0256540 A1 * | 11/2007 | Salter | 84/485 R |
| 2008/0276791 A1 * | 11/2008 | Lemons | 84/483.2 |
| 2009/0173212 A1 * | 7/2009 | Wold | 84/483.2 |
| 2009/0301287 A1 * | 12/2009 | Harvey et al. | 84/609 |

FOREIGN PATENT DOCUMENTS

| | | |
|---|---|---|
| ES | 8407350 A1 | 6/1984 |
| FR | 451 411 | 4/1913 |
| GB | 428005 A | 5/1935 |
| GB | 442226 | 2/1936 |
| GB | 539987 A | 10/1941 |
| GB | 2091019 A | 7/1982 |

OTHER PUBLICATIONS

European Search Report published Mar. 9, 2011 in corresponding European Patent Application No. EP 09 70 4094.

* cited by examiner

МUSICAL CONTROLLER

CROSS REFERENCE TO RELATED APPLICATION

The present application is a 35 U.S.C. §371 National Phase conversation of PCT/ES2009/000033, field Jan. 23, 2009, which claims benefits of Spanish Application No. 200800181, field Jan. 24, 2008, the disclosure of which is incorporated herein by reference. The PCT International Application was published in the Spanish language.

OBJECT OF THE INVENTION

The present invention relates to a musical controller, in other words to a device of the type that incorporates a series of keys that enable data to be entered in a computer or digital device, and that can be used via said devices as simulating various musical instruments.

Likewise, those keys can actuate a percussion, string or wind instrument.

The object of the invention is to provide a device with an independent interface of the wide and varied type of instrument that can be simulated via the controller, depicting the appearance of a staff, whereby the sound can be related to the conventional way of writing on a staff.

BACKGROUND OF THE INVENTION

Many controllers are known, designed to be connected to a computer or digital device, which make it possible to generate sounds by pressing their keys, which by electric signals are interpreted by said digital devices via the corresponding audio circuit to emit that particular sound.

These types of controllers have a configuration similar to a traditional musical instrument, such as a piano keyboard, a guitar, wind instruments, etc, so that, although they can be used to digitally generate sounds of multiple musical instruments, it is typical that they are only used to reproduce the sounds of the musical instrument to which their external configuration corresponds.

In this regard, to use said controllers it is necessary to have musical knowledge as well as knowledge of the particular instrument for their use.

Although devices exist that offer an interface by way of a staff, they do not allow, by simply pressing one key at a time, production of the twelve chromatic notes in all possible tonalities, but they have a complex structure, whereby it is necessary to press several keys at the same time to obtain altered notes. This makes it impossible to play chords in real time.

DESCRIPTION OF THE INVENTION

The musical controller disclosed herein resolves in a fully satisfactory manner the aforementioned problem, providing an interface by way of a staff, whereby the sounds to be generated can be related to the conventional way of writing on a staff.

Therefore, the device disclosed is based on a casing, whereon are represented the twelve chromatic musical notes in independent spaces that correspond to those of musical writing on a standard staff.

Each note is assigned three sensors or push-buttons, so that said sensors detect the pressing of the corresponding natural, sharp or flat note, (or double sharp or double flat or natural sign if the note was altered on the key signature) and a light indicator associated with said note is activated via a control circuit, as well as generating the corresponding electric signal to generate via an internal audio circuit, or by connection of the device to an external audio circuit, the sound corresponding to said musical note.

In accordance with another of the characteristics of the invention, it has been provided that the device has a MIDI input associated to its control circuit, so that via its connection to a computer or any other similar device that generates signals of this type, it is possible to analyse the musical notes of the input audio signal, by the illumination of the corresponding light indicators established on the corresponding staff, which means the device is an extremely effective teaching application, making it possible to analyse each of them the musical notes in real time.

Therefore, the device disclosed herein incorporates all the features of a conventional keyboard or MIDI instrument, adding the possibility of representing the musical notes, both visually and acoustically via a staff, in real time.

Finally, it should be stated that said sensors or push-buttons can be replaced by an equivalent solution, such as the inclusion of a touch screen that groups together all of them, or pressing keys by way of a hammer for string or percussion instruments, or valves for wind instruments.

Finally, it should be stated that said sensors or push-buttons can be replaced by an equivalent solution, such as the inclusion of a touch screen that groups together all of them, or pressing keys by way of a hammer for string or percussion instruments, or valves for wind instruments.

PREFERRED EMBODIMENT OF THE INVENTION

In accordance with the above, the device may incorporate a display (10) which can display data corresponding to the status thereof, as well as selecting the type of instrument that one wants to simulate using the device, information that will be coded by the control circuit and sent to the computer or device concerned so that it plays the simulated instrument when emitting the corresponding musical notes.

Figure 1:
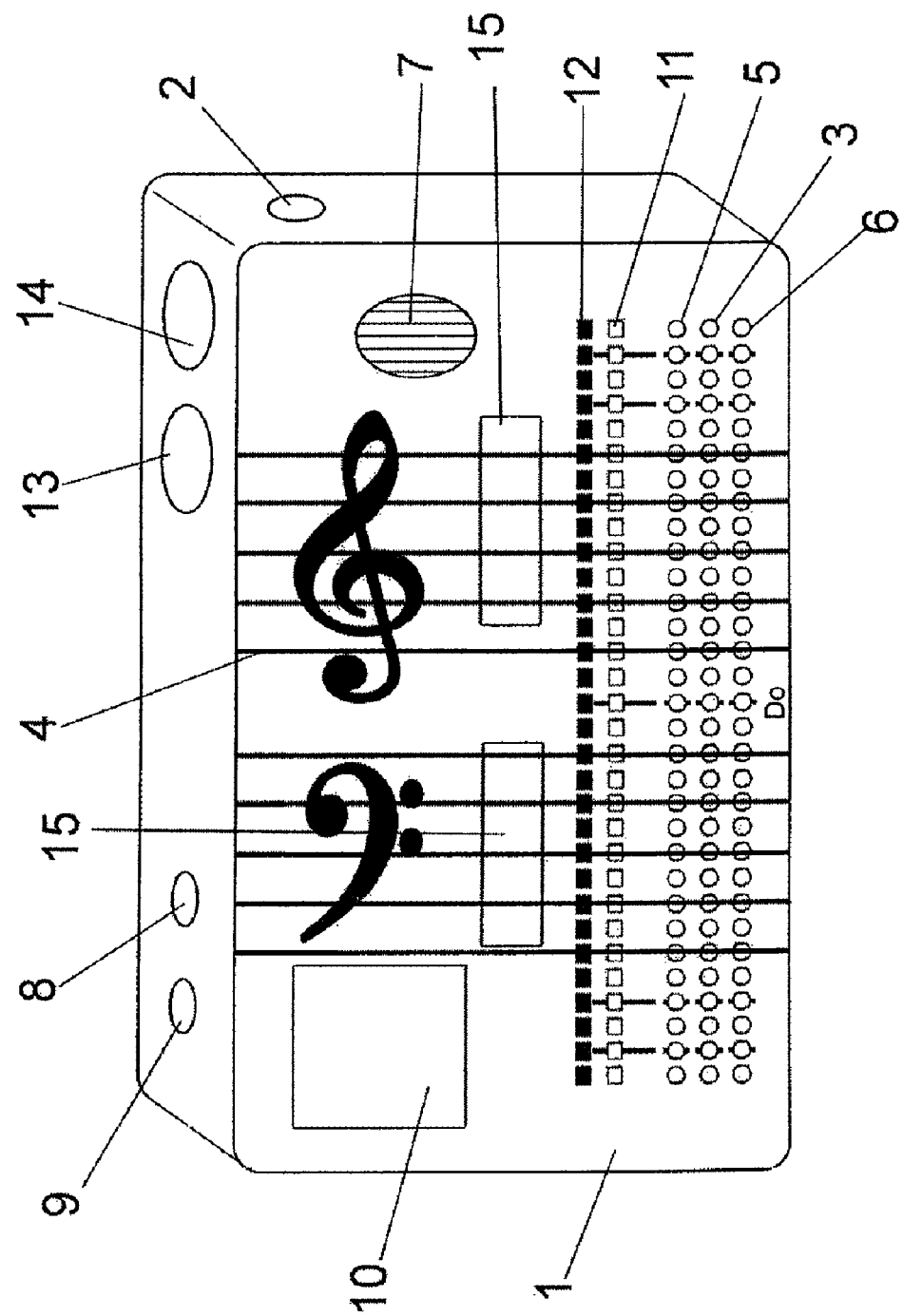
FIG. 1 is a perspective view of a musical controller with sensors or push-buttons.

FIG. 1 shows how the musical controller disclosed is formed by a casing (1), which is flat, cylindrical or some other suitable shape, wherein is established a control circuit, not represented in this figure, electrically powered via batteries or by a plug (2) connected to a power supply, a control circuit whereto are associated a series of sensors or push-buttons, which are disposed on the surface of said casing (1), in three alignments.

A first row of sensors (3) corresponds to the natural notes (or altered, if the note was present on the key signature), for which purpose a staff (4) will be represented on the casing, establishing each sensor or push-button (3) according to the possible notes that can be made on said staff.

A second alignment of sensors or push-buttons (5) is disposed in parallel to the sensors or push-buttons (3), those corresponding to sounds half a tone lower than the notes to which senaors or push-buttons(3) correspond: flats (or double flat or natural sign, if the note was present on the key singature).

Finally, the device incorporates a third alignment of sensors or push-buttons (6), disposed in parallel and in opposition to the sensors or push-buttons (5) and the sensors or push-buttons (3), sensors or push-buttons (6) corresponding to sounds half a tone sharper than the notes to which sensors or push-buttons (3) correspond: the sharps, (or double sharp or natural sign, if the note was present on the key signature).

Hence, and via the control circuit, by pressing the different push-buttons or sensors (3-5-6) in the positions of the staff (4) corresponding to the different musical notes, a melody or harmony is generated via the control circuit which can be directly listened to via an internal audio circuit, with the collaboration of at least one internal loudspeaker (7), or be played via the corresponding output (8) for its connection to a sound system, computer, amplifier or similar device, or directly as a string, percussion or wind instrument.

In this regard, it has been provided that the device also incorporates a headphone socket (9).

In accordance with the above, the device may incorporate a display (10) which can display data corresponding to the status thereof, as well as selecting the type of instrument that one wants to simulate using the device, information that will be coded by the control circuit and sent to the computer or device concerned so that it plays the simulated instrument when emitting the corresponding musical notes.

Additionally, the device may also incorporate another two displays (15), by way of a key singature, to define the tonality or alterations of the musical work.

Complementarily, it has been provided that, in correspondence with each sensor/push-button (3), a light indicator (11) is established in parallel, which displays the musical note which has been activated via said push-button, having provided the inclusion of light indicators (12), parallel to the previous ones that give an illuminated display of the sharp/flat alteration (or double sharp, double flat or natural sign) of the note that is sounding, if it had any.

In accordance with another characteristic of the invention, it has been provided that the control circuit incorporates MIDI signal processing means, for which it will have an input (13) and an output (14) therefor, so that, by means of an input MIDI signal of this type, it is possible to display the different light indicators(11-12) established on the staff (4), the different notes composing the melody or harmony, so that the sound is related to the conventional way of writing on a staff visually and in real time.

Figure 2:
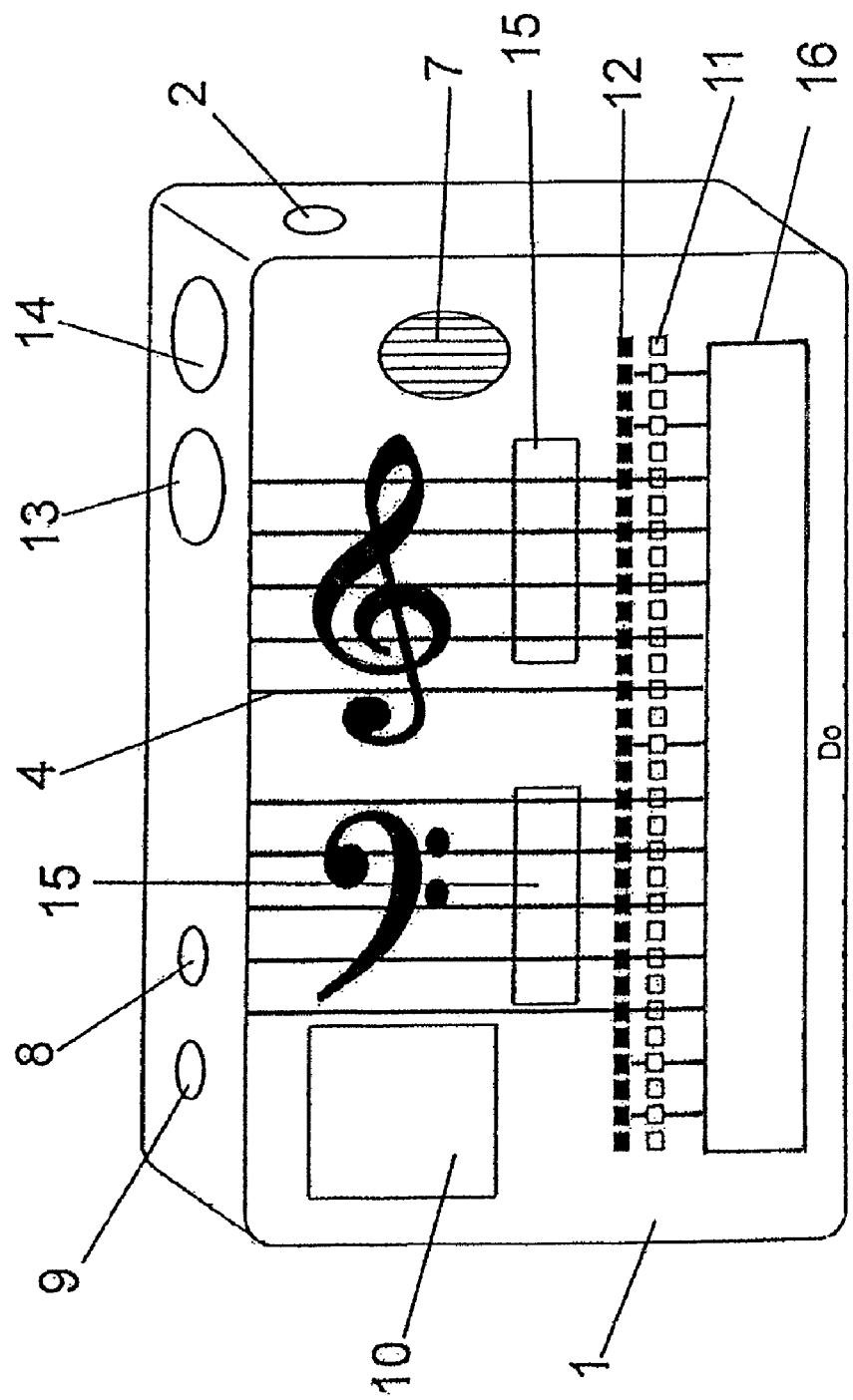
FIG. 2 is a perspective view of a musical controller with a touch screen.
Figure 3:
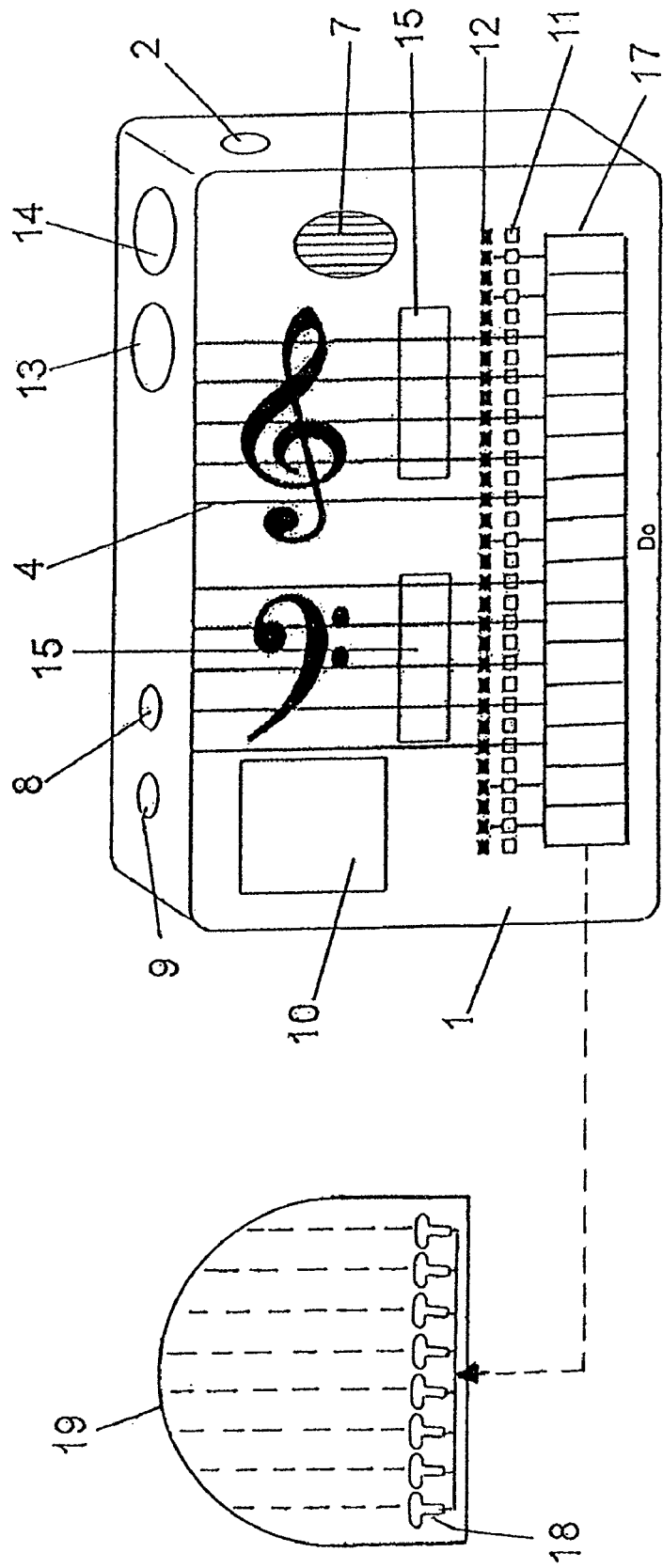
FIG. 3 is a perspective view of a musical controller with keys and a schematic of a string instrument to which the musical controller is connected.
Figure 4:
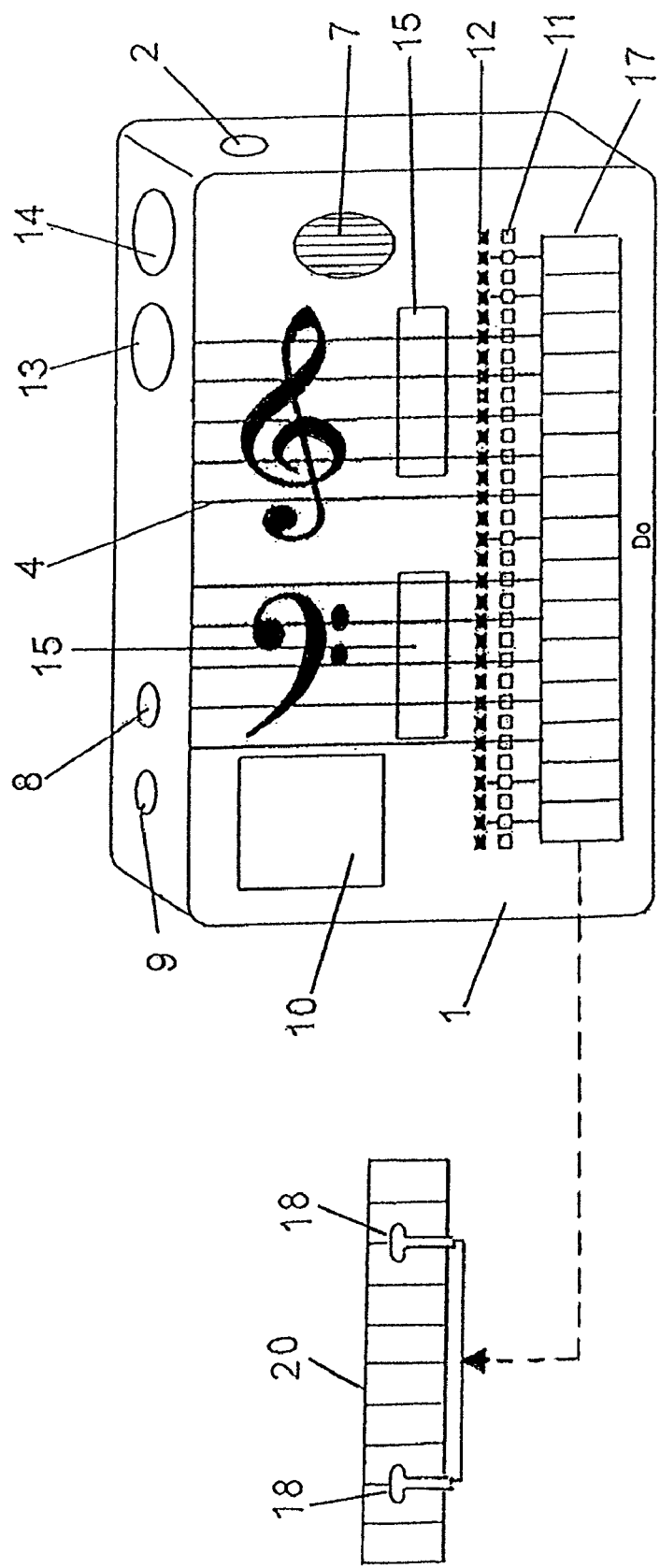
FIG. 4 is a perspective view of a musical controller with keys and a schematic of a percussion instrument to which the musical controller is connected.
Figure 5:
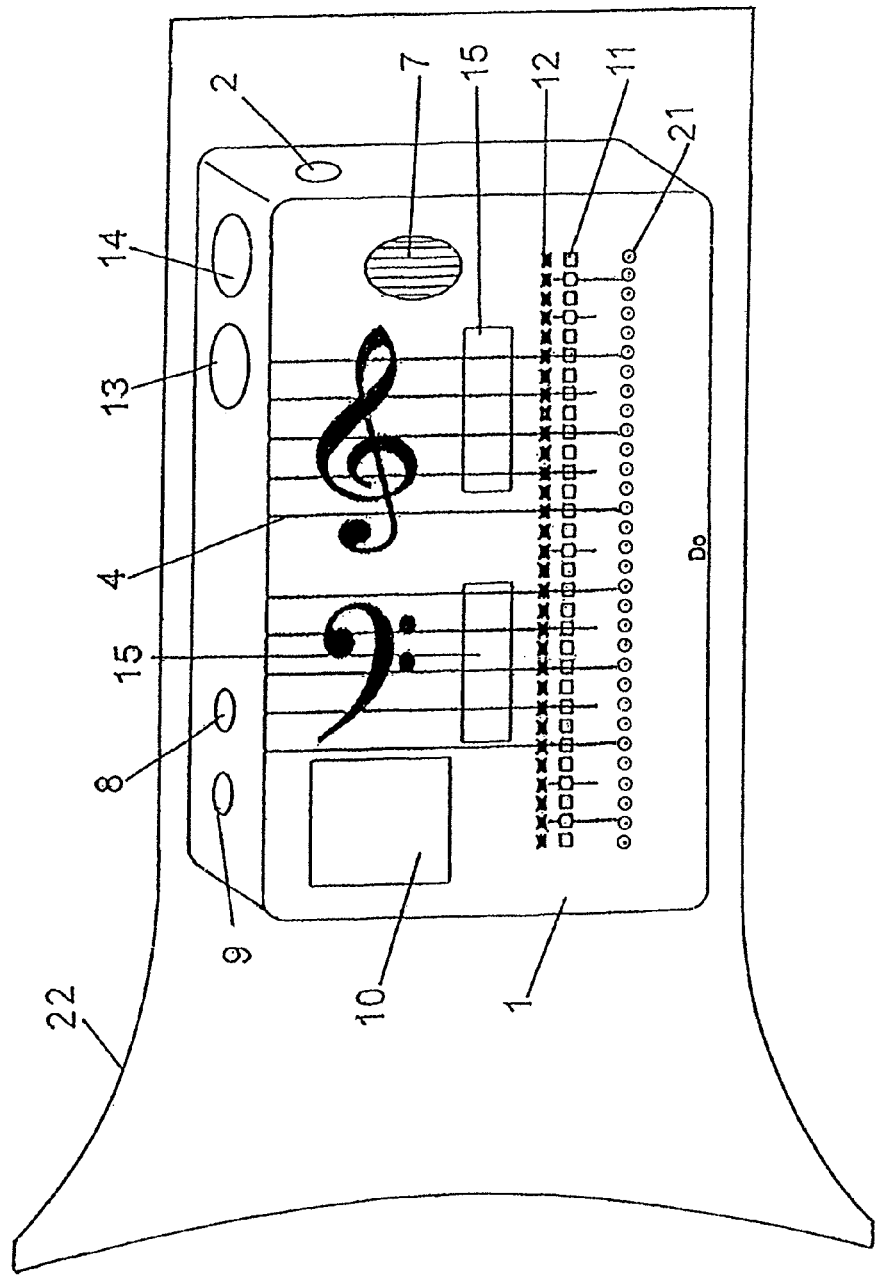
FIG. 5 is a perspective view of a musical controller with valves and a schematic of a portion of a wind instrument to which the musical controller is connected.

FIG. 2 is a perspective view of the same musical controller shown in FIG. 1, except that push-buttons or sensors (3), (5), (6) have been replaced by touch screen (16). FIG. 3 is a perspective view of the same musical controller shown in FIG. 1, except that push-buttons or sensors (3), (5), (6) have been replaced with keys (17). In addition, FIG. 3 shows the musical controller connected to string instrument (19) with hammers (18). FIG. 4 is a perspective view of the musical controller as shown in FIG. 3, but the musical controller of FIG. 4 is connected to percussion instrument (20) with hammers (18). FIG. 5 is a perspective view of the musical controller as shown in FIG. 1, except that push-buttons or sensors (3), (5), (6) have been replaced by valves (21) and the musical controller is connected to wind instrument (22).

What is claimed is:

1. Musical controller having a casing, the casing enclosing a control circuit for the processing of audio signals produced by pressing of sensors/push-buttons of the musical controller, corresponding to different musical notes, and/or by the input of audio signals in MIDI format, wherein a staff is placed on the casing, three sensors/push-buttons being associated with each note of the staff and being located on the staff, a first sensor/push-button corresponding to one of a natural note or, if a sharpened or flattened note is present on a key signature placed on the staff, the sharpened or flattened note, a second sensor/push-button corresponding to a sound which is half a tone lower than a natural note, a flattened note, or a sharpened note corresponding to the first sensor/push-button, the sound being one of a flat of a note corresponding to the first sensor/push-button, or, if a flattened note is present on the key signature, a double flat of the note corresponding to the flattened note which, in turn, corresponds to the first sensor/push button, or, if a sharpened note is present on the key signature, a natural sign of the sharpened note corresponding to the first sensor/push-button, and a third sensor/push-button corresponding to a sound which is half a tone higher than a natural note, a sharpened note, or a flattened note corresponding to the first sensor/push-button, the sound being one of a sharp of a note corresponding to the first sensor/push-button or, if a sharpened note is present on the key signature, a double sharp of the note corresponding to the sharpened note, which, in turn, corresponds to the first sensor/push-button, or, if a flattened note is present on the key signature, a natural sign of the flattened note corresponding to the first sensor/push button, audio signals, corresponding to a note, which, in turn, corresponds to a first sensor/push-button, being produced by pressing the first sensor/push-button, audio signals, corresponding to the sound which, in turn, corresponds to the second sensor/push-button and which is half a tone lower than the note, which, in turn, corresponds to the first sensor/push-button, being produced by pressing the second sensor/push-button, and audio signals, corresponding to the sound which, in turn, corresponds to the third sensor/push-button and which is half a tone higher than the note, which, in turn, corresponds to the first sensor/push-button, being produced by pressing the third sensor/push-button.

2. Musical controller, according to claim 1, wherein a series of light indicators is disposed in parallel to each group of sensors/push-buttons and are configured to be activated by the control circuit upon pressing of said sensors/push-buttons and/or upon input of a MIDI signal by a connector, each of the series of light indicators being indicative of a note that is sounding.

3. Musical controller, according to claim 1, wherein a touch screen replaces the sensors/push-buttons.

4. Musical controller, according to claim 1, wherein keys replace the sensors/push-buttons, the keys actuating a string or percussion instrument by at least one hammer.

5. Musical controller, according to claim 1, wherein valves replace the sensors/push-buttons, the valves actuating a wind instrument.

6. Musical controller, according to claim 1, wherein two light indicators are provided for each note of the staff, a first light indicator corresponding to natural or flattened or sharpened notes, and a second light indicator corresponding to sharp or double sharp notes, flat or double flat notes, or natural sign notes.

7. Musical controller, according to claim 1, wherein the control circuit is associated with at least one internal loudspeaker.

8. Musical controller, according to claim 1, wherein the control circuit is associated with an audio output.

9. Musical controller, according to claim 1, wherein the control circuit is associated with an earphone output.

10. Musical controller, according to claim 1, wherein the control circuit is associated with a display of status of the device, as well as displays that act as a key signature.

* * * * *